Patented July 21, 1953

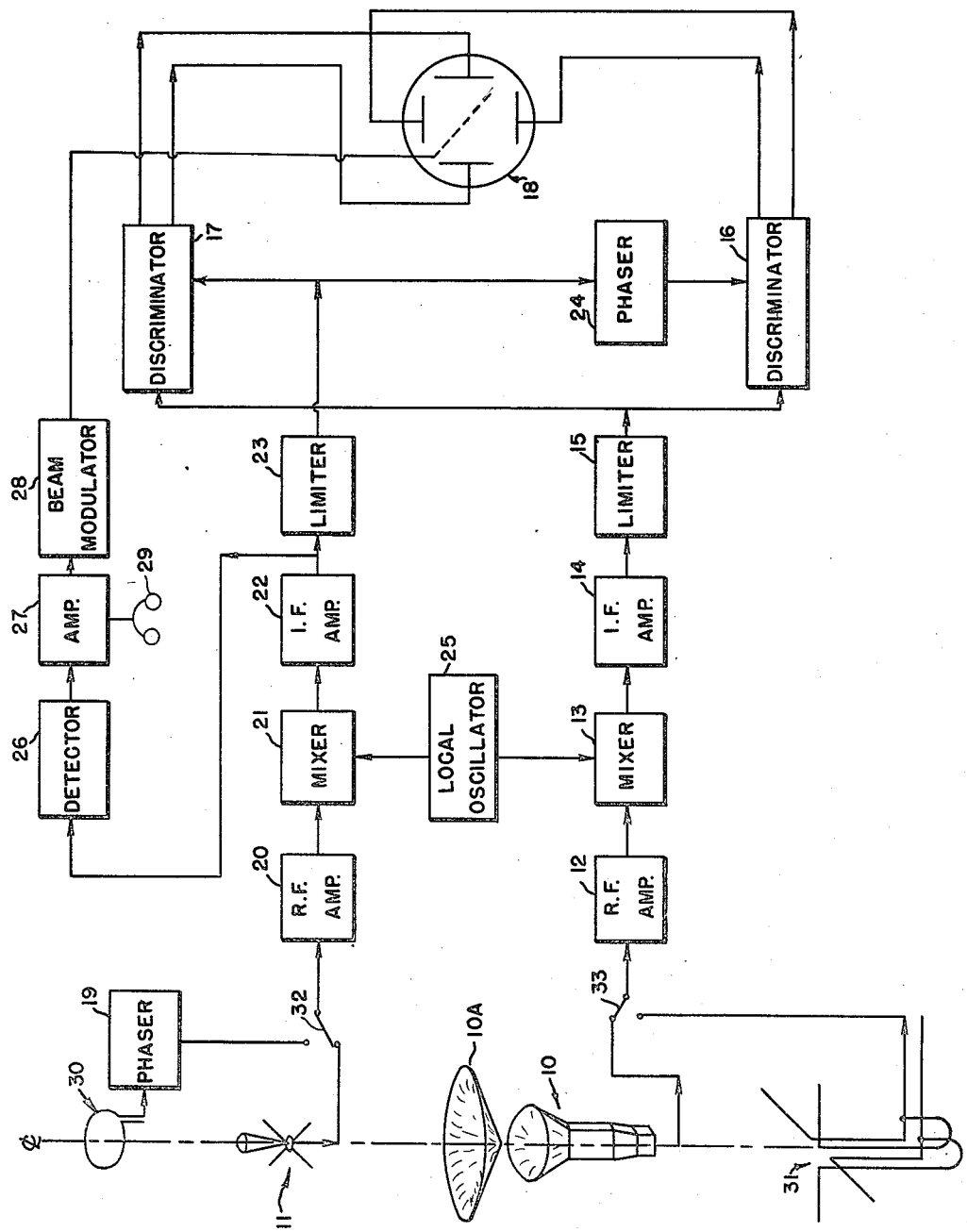

2,646,566

UNITED STATES PATENT OFFICE 2,646,566

PHASE-TYPE DIRECTION FINDER SYSTEM

William D. McGuigan, Cambridge, Mass., assignor to the United States of America as represented by the Secretary of War Application March 1, 1946, Serial No. 651,312

4 Claims. (Cl. 343—123)

This invention relates generally to electrical apparatus and more particularly to a phase-type instantaneous direction-finding system.

Some direction-finding systems previously used have been limited to the reception of a single signal at one time. Other systems capable of displaying the bearing of several signal sources simultaneously have been used involving a rotatable directional antenna with the accompanying mechanical and electrical disadvantages inherent therein; but even these direction finders were incapable of presenting oscilloscope patterns from which accurate bearings could be determined when two or more signal patterns overlapped on the oscilloscope screen without carefully interpreting the pattern on the oscilloscope screen (due to the signal sources having bearings which differ by only a slight amount).

It would be very desirable in a direction-finder system to eliminate the necessity of using rotating antennas, to be able to receive signals from all directions simultaneously and to be able to identify and determine accurately the bearing of each of a plurality of signal sources when these signals are received from bearings which differ by only a slight amount.

It is an object of the present invention to provide a direction-finder system without the use of rotating or directional antennas.

It is also an object to provide a direction-finder system capable of simultaneously displaying the bearing of a plurality of radio frequency signal sources.

It is another object to provide a direction-finding system in which the type of intelligence presentation permits the bearing of each of a plurality of radio frequency signal sources to be simultaneously and accurately determined, even when two or more radio frequency signal sources occur at bearings which differ by only a slight amount.

The essential components of a system which accomplishes the above objects consists of two antennas and a means for comparing the phase difference of signals received on the two antennas.

A specific example of such a system includes a circularly polarized horn-type antenna, oriented in a vertical position, a vertically polarized reference antenna with its vertical axis in line with that of the circularly polarized antenna and amplifying and phase discriminating circuits for applying properly phased voltages to a cathode ray oscilloscope, whereby the signals received from the two antennas are compared and produce a deflection on the cathode ray oscilloscope, the angular position of which is proportional to the phase difference between the two signals.

Other objects, features and advantages of this invention will suggest themselves to those skilled in the art and will become apparent from the following description of the invention taken in connection with the accompanying drawing in which is shown a block diagram of one embodiment of a system employing the principles of this invention.

Referring now to the single figure of the drawing, a circularly polarized horn-type antenna 10 having a conical reflector 10A is oriented in a vertical position. The antenna 10 is responsive to circularly polarized fields having horizontally and vertically polarized components. On a vertical axis common to that of antenna 10 is shown a vertically polarized reference antenna 11. Antenna 10 feeds a conventional superheterodyne receiver consisting of a radio frequency amplifier 12, a mixer 13 and an intermediate frequency amplifier 14. A limiter 15 connects intermediate frequency amplifier 14 to a discriminator circuit comprising 16 and 17 which drive the vertical and horizontal deflection plates, respectively, of a cathode ray oscilloscope 18. Reference antenna 11 is connected to a second superheterodyne receiver consisting of a radio frequency amplifier 20, a mixer 21 and an intermediate frequency amplifier 22. A limiter 23 connects intermediate frequency amplifier 22 directly to discriminator 17 and to discriminator 16 through a phaser 24.

The two above-mentioned superheterodyne receivers are similar and are tuned by a common local oscillator 25. The output of intermediate frequency amplifier 22 also feeds an audio frequency circuit comprising a detector 26, amplifier 27 and a beam modulator 28. Headphones 29 are connected to amplifier 27. The output of beam modulator 28 is connected to the intensity grid of cathode ray oscilloscope 18.

For the reception of horizontally polarized radio frequency signals, a horizontally polarized reference antenna 30 may be used instead of vertically polarized antenna 11. For operation at frequencies for which circularly polarized horn-type antenna 10 is not suitable, a turnstile-type circularly polarized antenna 31 is provided. A selection of the most desirable pair of antennas may be made by the use of switches 32 and 33.

Referring now to the operation of this system shown in the drawing and more particularly to the circularly polarized horn-type antenna 10, the phase of a received signal at the output of receiving antenna 10 is related to the direction from which the signal originated. For example, an electromagnetic wave intercepted by antenna 10 from a reference direction of zero degrees azimuth will enter radio frequency amplifier 12 with a certain electrical phase; whereas, if this same electromagnetic wave had approached antenna 10 from a direction having an azimuth bearing of 90 degrees from the above reference direction of zero degrees, this electromagnetic wave would, under this second set of conditions, arrive at radio frequency amplifier 12 with a phase 90 electrical degrees different from the first set of assumed conditions. Any signal arriving at antenna 10 from an azimuth bearing other than the above-mentioned two bearings will arrive at radio frequency amplifier 12 having a relative electrical phase which is related to its azimuth bearing.

To summarize the above paragraph, it is characteristic of a vertically oriented circularly polarized antenna that the relative electrical phase of a received signal at the output terminals of the antenna, is a function of a given azimuth from which the signal is received.

A signal received by the vertically polarized reference antenna 11 will have no phase shift as a function of azimuth bearing of a received signal. Therefore, a comparison of the phase of a signal received by antenna 10 with that of reference antenna 11 is all that is needed to determine the bearing of a received signal. The phases of the two signals received by antennas 10 and 11 are amplified for comparison by feeding each into a separate channel of a dual channel superheterodyne receiver. The radio frequency amplifiers 12 and 20 are broad band, fixed tuned amplifiers and for convenience the two receiver channels are tuned by a common local oscillator 25.

The phase difference between the outputs of the two intermediate frequency amplifiers 14 and 22 will be the same as the phase difference of the signals entering the receiver circuit. The two signals from the intermediate frequency amplifiers 14 and 22 are then fed to limiters 15 and 23, respectively, and the output voltages of these limiters will be equal in magnitude.

The output signals from limiters 15 and 23 are fed to phase-discriminators 16 and 17. In these phase discriminators, if the two input signals are less than 90 electrical degrees out of phase, the output is a positive voltage. If they are more than 90 electrical degrees out of phase, they produce a negative voltage. If they are exactly 90 electrical degrees out of phase, there is no output.

One of the limiters 23 is connected to discriminator 16 through a phaser 24 which is a network for shifting the phase of its output voltage 90 electrical degrees from that of its input voltage. Accordingly, when the output of one discriminator is a maximum voltage, the output of the other is zero. Since the two discriminators 16 and 17 are connected to the deflection plates of cathode ray oscilloscope 18, the angular position of the spot or trace on the screen of cathode ray oscilloscope 18 is proportional to the phase difference between the signals coming from the two limiters 15 and 23. This difference is, in turn, a function of the azimuth bearing of the received signal.

Because the output of the discriminators 16 and 17 is proportional to both amplitude and phase, the two signals have been made equal in amplitude by the use of limiters 15 and 23.

This system will not operate satisfactorily when two or more continuous wave signals are presented simultaneously. For this reason its usefulness is limited when continuous wave signals are to be received. However, if pulsed signals are being received, the use of this system is greatly extended because the probability of two or more pulses from separate signal sources occurring simultaneously is quite small. Therefore, the azimuth bearings of pulsed signals from a plurality of sources can be identified at the same time.

For increased sensitivity, two reference antennas are made available for use, one vertically polarized antenna such as 11 and one horizontally polarized antenna such as 30. Only one of the above reference antennas would be used at any one time. When switching from a vertically polarized reference antenna to a horizontally polarized reference antenna, a phase shifting circuit such as phaser 19 is used with one of the alternate antennas so that the same position on the screen of cathode ray oscilloscope 18 will represent the same azimuth bearing when either reference antenna is used. Phaser 19 adjusts the total electrical length of the transmission line between antenna 30 and radio frequency amplifier 20 to be equal to the total electrical length of the transmission line between antenna 11 and radio frequency amplifier 20.

For aural reception and to provide a suitable voltage for controlling an intensity grid of cathode ray oscilloscope 18, a signal from intermediate frequency amplifier 22 is fed to an auxiliary circuit comprising a detector 26, an amplifier 27 and a beam modulator 28. A device, such as headphones 29, may be connected to audio frequency amplifier 27.

It will be apparent that there may be deviations from the invention as described which still fall fairly within the spirit and scope of the invention. Accordingly all such deviations are claimed which fall fairly within the spirit and scope of the invention as identified in the hereinafter appended claims.

What is claimed is:

1. A phase-type instantaneous direction finding system including a circularly polarized horn-type antenna oriented in a vertical position, a vertically polarized reference antenna aligned along the vertical axis of said horn-type antenna, amplifying means connected to said antennas comprising a dual channel superheterodyne-type receiver having a common local oscillator for tuning said channels, limiter means in the output of each of said receiver channels for maintaining equal and constant output voltages from said receiver channels, a cathode ray oscilloscope having an intensity control grid, phase discriminator means connecting the output of said limiters to the deflection plates of said cathode ray oscilloscope comprising a first phase discriminator fed by each of said limiters for supplying a voltage to the vertical deflection plates of said cathode ray oscilloscope and a second phase discriminator having one of said limiters connected directly to its input and a 90 electrical-degree phase shifting network connecting the output of the other of said limiters to its input and an auxiliary channel circuit connected to one of said receiver channels comprising a detector and means for deriving a beam modulating voltage from said detector for application to said intensity grid, whereby signals received by said antennas are compared and produce a deflection on said cathode ray oscilloscope, the angular position of which is proportional to the phase difference between said signals.

2. A phase-type instantaneous direction finding system including a circularly polarized antenna oriented in a vertical position, a plane polarized reference antenna aligned with its vertical axis common to that of said circularly polarized antenna and means connected to said antennas for comparing the phase difference between signals received by said antennas comprising a cathode ray oscilloscope having an intensity control grid, a dual channel superheterodyne receiver for amplifying signals received by said antennas, limiter means in the output of each of said receiver channels for maintaining equal and constant output voltage amplitudes, phase discriminator means connecting said limiters to the deflection plates of said cathode ray oscilloscope and an audio control voltage channel including detector and amplifier means connected to one of said receiver channels for deriving a beam modulating voltage for application to said intensity grid, whereby the phase difference between signals received by said antennas is compared to produce a deflection on said cathode ray oscilloscope, the angular position of which is proportional to the azimuth bearing of said received signal.

3. A phase-type direction finding system for the simultaneous reception of a plurality of pulsed signals including a circularly polarized antenna, a plane polarized reference antenna, amplifying means connected to said antennas, limiter means connected to said amplifying means, a cathode ray oscilloscope having an intensity control grid and beam deflection plates, means for deriving a modulating voltage from said amplifying means for application to said intensity control grid in response to a signal being received by said antennas and phase discriminator means connecting said limiters to said deflection plates whereby the phase difference between the signals received by said antennas is compared and produces a deflection on said cathode ray oscilloscope, the angular position of which is proportional to the azimuth bearings of said received signals.

4. A phase-type direction finding system for the reception of signals from at least one signal source, comprising a circularly polarized antenna, a plane polarized reference antenna and means for comparing the phase difference of signals received from said signal source by each of said antennas, whereby the angular bearing of said signal source determines the magnitude of said phase difference.

WILLIAM D. McGUIGAN.

References Cited in the file of this patent

UNITED STATES PATENTS

| Number | Name | Date |
|---|---|---|
| 1,892,221 | Runge | Dec. 27, 1932 |
| 2,202,400 | Roberts | May 28, 1940 |
| 2,204,052 | Roberts | June 11, 1940 |
| 2,282,030 | Busignies | May 5, 1942 |
| 2,312,799 | Carter | Mar. 2, 1943 |
| 2,329,199 | Hefele | Sept. 14, 1943 |
| 2,403,727 | Loughren | July 9, 1946 |
| 2,404,238 | Loughlin | July 16, 1946 |
| 2,412,320 | Carter | Dec. 10, 1946 |
| 2,412,669 | Bedford | Dec. 17, 1946 |